United States Patent [19]

Koslowski et al.

[11] Patent Number: 5,273,581
[45] Date of Patent: Dec. 28, 1993

[54] METHOD OF MAKING A HYDRAULIC BINDER SETTABLE UPON COMBINATION WITH WATER

[75] Inventors: Thomas Koslowski; Udo Ludwig; Alexander Fröhlich, all of Aachen, Fed. Rep. of Germany

[73] Assignees: Promineral Gesellschaft zur Verwendung von Minerstoffen mbH, Essen; Sicowa Verfahrenstechnik fur Baustoffe GmbH & Co. KG, Aachen, both of Fed. Rep. of Germany

[21] Appl. No.: 370,902

[22] Filed: Jun. 23, 1989

[30] Foreign Application Priority Data

Jun. 24, 1988 [DE] Fed. Rep. of Germany ....... 3821277
Dec. 23, 1988 [DE] Fed. Rep. of Germany ....... 3843625

[51] Int. Cl.⁵ .................. C04B 7/21; C04B 11/30; C04B 28/08; C04B 28/14
[52] U.S. Cl. .................................................. 106/782
[58] Field of Search ............ 423/555, 171, 172; 106/38.27, 38.3, 109, 110, 111, 782

[56] References Cited

U.S. PATENT DOCUMENTS

| | | | |
|---|---|---|---|
| 941,498 | 11/1909 | Clapham | 106/110 |
| 2,220,703 | 11/1940 | Bean | 106/110 |
| 2,531,496 | 11/1950 | Bean | 106/38.3 |
| 2,539,408 | 1/1951 | Ensign | 106/38.3 |
| 2,947,643 | 8/1960 | Kamlet | 106/782 |
| 3,720,609 | 3/1973 | Smith | 106/109 |
| 4,146,402 | 3/1979 | Kira et al. | 106/782 |
| 4,284,121 | 8/1981 | Horton | 106/38.3 |
| 4,357,165 | 11/1982 | Helferich et al. | 106/84 |
| 4,636,262 | 1/1987 | Reed | 106/38.3 |
| 4,673,543 | 6/1987 | Akasaka et al. | 106/782 |

FOREIGN PATENT DOCUMENTS

| | | | |
|---|---|---|---|
| 52-17511 | 2/1977 | Japan | 423/555 |
| 53-30820 | 3/1977 | Japan | 106/782 |
| 52-40523 | 3/1977 | Japan | 423/555 |
| 53-32900 | 3/1978 | Japan | 423/555 |
| 53-63430 | 6/1978 | Japan | 106/782 |
| 54-51995 | 4/1979 | Japan | 423/555 |
| 54-99126 | 8/1979 | Japan | 106/782 |
| 55-121952 | 9/1980 | Japan | 106/782 |
| 58-36956 | 3/1983 | Japan | 06/782 |

OTHER PUBLICATIONS

German Industrial Standard DIN 1164, Teil 1 Dec. 1986.
Keil, Fritz, Zement, Herstellung und Eigenschaften Spinger Verlag Berlin 1987 pp. 111-121.
Kuhl; Hans, Das Baustoff Zement, VEB Verlag fur Bauwessen, Berlin 1963 pp. 72-79.
Literatur-Zusammenstellung, Fachbereich Baustoff, 5300 Weimar, Belvederer Allee 17, 6 pages total (including pp. 1-4).

Primary Examiner—Gary P. Straub
Attorney, Agent, or Firm—Herbert Dubno

[57] ABSTRACT

Calcium sulfate alpha hemihydrate and foundry sand are milled to cement fineness and form a hydraulic binder, as a mixture with both high early setting strength and excellent water resistance. The composition relies upon a sulfate activation of the foundry sand rather than an alkali activation thereof.

16 Claims, 1 Drawing Sheet

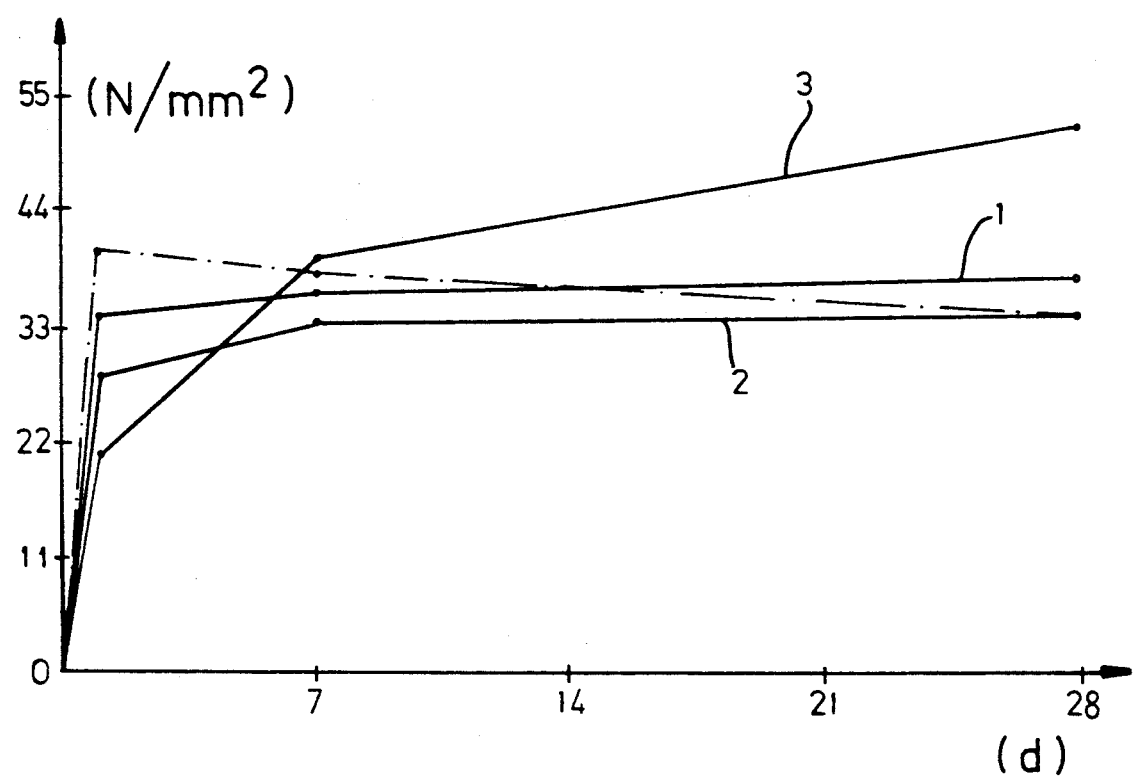

METHOD OF MAKING A HYDRAULIC BINDER SETTABLE UPON COMBINATION WITH WATER

FIELD OF THE INVENTION

Our present invention relates to the method of making a hydraulic binder, i.e. a binder which becomes settable into a hardened product upon combination or make-up with water; the invention also relates, therefore, to a method of making a hardened composition utilizing a hydraulic binder, to an improved hydraulic binder composition as made by the first-mentioned method and for use in the second method. The invention, of course, also relates to hardened compositions resulting from the setting of the latter composition.

In another aspect of the invention, the invention can relate to a new use for calcium sulfate alpha hemihydrate, a product which can be obtained from the wet scrubbing of sulfate oxide containing flue gases as a component of an improved binder.

BACKGROUND OF THE INVENTION

Calcium sulfate alpha hemihydrate is a product which can be obtained from the sludges resulting from the desulfurization of flue gases utilizing a wet scrubbing process in which calcium oxide or calcium carbonate is added to the scrubbing solution.

This product is, with increasing environmental concern with respect to acid rain and pollution of the environment by the flue gases, produced in increasing quantities and an effective use for the product eliminates, of course, problems which may result from disposal of desulfurization residue.

On the other hand, it is known to use the calcium sulfate alpha hemihydrate in hydraulic binders. Indeed, in the literature summary (*Bauakademie der DDR, Bauinformation*, Literaturzusammenstellung Nr. 7/2483, Titel 4., *Gordasevski* inter alia), calcium sulfate alpha hemihydrate and Portland cement can be mixed and pozzolan, depending upon the calcium oxide content, can be added, thereby making use of the calcium sulfate alpha hemihydrate as a component of the resulting hydraulic binder contributing a fast-setting action to the binder. Tests have shown, however, that the water resistance of a hardened mixture of this latter three-component binder is not sufficiently reproducible and may not be satisfactory for many purposes.

In the present description, we may refer to "fast hardening strength" to mean the compressive strength which the hydraulic binder, upon make-up with water, generates during its initial setting period. The "water resistance" to which we refer is, of course, the resistance of the set product to water as evidenced, for example, by its low water take-up. The binder generally is provided in finely milled form and may be made-up with a sufficient quantity of water to effect the setting.

In the past, when calcium sulfate alpha hemihydrate has been used as a significant component of a fast-setting water resistant binder, i.e. a binder which, when made-up with water, yields a fast-setting composition which is resistant, upon setting, to water, it has been the practice to add hydrophobic or hydrophobizing agents to the composition. Paraffin is one such hydrophobizing agent. The product thus obtained has good water resistance or, stated otherwise, can have the desired degree of water resistance depending upon the quantity or proportion of the paraffin used, but the effect is only a short-term effect and the hydrophobizing agent is generally too expensive for use in a large-scale application.

OBJECTS OF THE INVENTION

It is, therefore, the principal object of the present invention to provide an improved method of making a hydraulic binder which is fast-setting upon make-up with water and with a defined and reproducible water resistance upon hardening which can make use of calcium sulfate alpha hemihydrate as an important component or a main component and yet be free from the drawbacks of prior art hydraulic binders.

Another object of this invention is to provide a method of making a hydraulic binder which yields a product with highly reproducible fast-setting strength and water resistance, but which is far more economical than earlier methods.

Another object of the invention is to provide an improved method of making a hardenable composition utilizing the fast-acting hydraulic binder effect of the calcium sulfate alpha hemihydrate.

Still another object of the invention is to provide an improved low-cost hydraulic binder which, upon make-up with a suitable amount of water, will be fast-setting and yet provide a definite and reproducible water resistance of the hardened mass.

Still another object of the invention is to provide an improved water-resistant hardened composition which is economical to make.

SUMMARY OF THE INVENTION

We have found, quite surprisingly, that a fast-setting hydraulic binder which can be made up with water to yield a fast-setting composition which will have well-defined, reproducible and permanent resistance to water in the hardened state, can be made by combining only two essential components to yield this effect, namely, the calcium sulfate alpha hemihydrate and foundry sand.

More specifically, the invention is a process for producing a hydraulic binder which, upon make-up with water, provides a fast-setting composition having a defined water resistance of the hardened or set mass, in which calcium sulfate alpha hemihydrate in a predetermined starting quantity is provided as the rapid setting component and as a component whose hardening mass in the absence of the second component has a time-dependent water-resistance curve which, commencing from a high early resistance value upon rapid setting, has a negative slope in the first 28 days. With this calcium sulfate alpha hemihydrate component, the foundry sand is mixed and in a quantity or proportion so selected with respect to the starting quantity of the calcium sulfate alpha hemihydrate that, following the rapid setting, there is a formation of crystalline ettringite and calcium hydrosilicate phases and so that the time-dependent water-resistance curve of the hydraulic binder for the hardening mixture during the first 28 days has overall a positive slope.

In the water-made-up binder mixture, crystalline ettringite appears to result from a lime deficiency in the composition and to contribute to the improved water-resistance curve.

The water-resistance curve can be the curve of a suitable characteristic of the hardening mass with time, for example, a measurement of the compressive strength in $N/mm^2$ with time for a sample stored under water.

The calcium sulfate alpha hemihydrate and the foundry sand can be finely milled. Advantageously, the calcium sulfate alpha hemihydrate and the foundry sand are milled together and thereby mixed. It is, however, also possible to mix the pulverulent components.

The method of making the hydraulic binder which is fast-setting upon make-up with water and has a definite water resistance upon hardening can thus comprise the steps of:

admixing:
a predetermined starting quantity of pulverulent calcium sulfate alpha hemihydrate as a fast-setting component which, upon mixture with water, forms a hardenable mass having a time-dependent water-resistance curve which has a negative slope starting from an early water-resistance value with fast setting over an initial twenty-eight day period, with foundry sand to form a composition; and
controlling the proportion of the foundry sand admixed with the quantity of the calcium sulfate alpha hemihydrate that, upon mixture of the composition with water and fast setting, there is a formation of ettringite and calcium hydrosilicate phases and the time-dependent water-resistance curve of the hardening mixture has an overall positive slope in the initial twenty-eight days.

Correspondingly, the method of making a hardened composition in accordance with this invention can comprise the steps of:

mixing water with a hydraulic binder fast-setting upon make-up with water and with defined water resistance upon hardening, the binder comprising:
a predetermined quantity of pulverulent calcium sulfate alpha hemihydrate as a fast-setting component which, upon mixture with water, forms a hardenable mass having a time-dependent water-resistance curve which has a negative slope starting from an early water-resistance value with fast setting over an initial twenty-eight day period, and
foundry sand forming a composition with the calcium sulfate alpha hemihydrate, the proportion of the foundry sand admixed with the quantity of the calcium sulfate alpha hemihydrate being such that, upon mixture of the composition with water and fast setting, there is a formation of ettringite and calcium hydrosilicate phases and the time-dependent water-resistance curve of the hardening mixture has an overall positive slope in the initial twenty-eight days; and
causing the resulting mixture to harden.

Preferably, the calcium sulfate alpha hemihydrate is recovered from the desulfurization gypsum of a wet scrubbing flue gas desulfurization plant and can contain chloridic components in the form of, for example, calcium chloride.

Preferably, the foundry sand which is used has an $Al_2O_3$ content of at least 13 percent by weight and the value of the ratio $(CaO+MgO+Al_2O_3)/SiO_2$ is at least 1.6.

To increase the strength of the hardened mass, the chloridic components if they are not present in the calcium sulfate alpha hemihydrate, can be added to the composition so that they make-up 0.2 to 3 mass percent of the total quantity of the mixture. A suitable chloride additive can be sodium chloride.

When calcium sulfate alpha hemihydrate is used which is derived from desulfurization gypsum and the latter is obtained by the wet scrubbing of the flue gases in a flue gas desulfurization plant, the addition of chloridic components is generally not necessary.

It has also been found to be advantageous to add iron sulfate, preferably in an amount of 0.2 to 3 mass percent with respect to the total quantity of the binder. The iron sulfate has been found to effect a stabilization of the long term ettringite crystal formation and tends to overcome reaction-reducing passivation or coating of the foundry sand grains.

Of course, while alkali additives are by no means necessary in the composition of the invention, known accelerators of the alkali hydroxide, alkali carbonate, alkali sulfate (or mixtures thereof) can be added. It is also possible to add conventional retarders such as the citric acid monohydrate. Other additives can be employed, for example, flow-promoting, diluting, thickening, adhesive and dispersing agents can be used.

Mention may be made of the fact that it has been proposed to use gypsum, e.g. as the hemihydrate or anhydrite, in a hydraulic binder and to mix foundry sand therewith (German Industrial Standard DIN 4210 or German Patent Document 30 49 003). However, here an alkali activation of the foundry sand is required, e.g. through the addition of milled cement clinker or Portland cement. The water resistance of hardened components made with such binders is variable. A well-defined and reproducible water resistance over wide ranges of mixing proportions and compositions is not obtained. Note that the foundry sand of DIN 4210, which is also known as metallurgical plant sand (see p. 116 of ZEMENT, Herstellung und Eigenschaften (Cement - Manufacture and Characteristics), Fritz Keil, Springer-Verlag, Berlin, Heidelberg, New York, 1971) is described (DIN 1164, Part 1, page 2as a finely ground lime-alumina-silicatic blast furnace slag resulting from rapid cooling with a

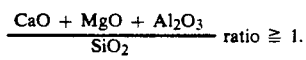

$$\frac{CaO + MgO + Al_2O_3}{SiO_2} \text{ ratio} \geq 1.$$

BRIEF DESCRIPTION OF THE DRAWING

The above objects, features and advantages of our invention will become more readily apparent from the following description, reference being made to the accompanying drawing, the sole FIGURE of which is a diagram illustrating the principles of the invention.

SPECIFIC DESCRIPTION

In the binder of the invention, calcium sulfate alpha hemihydrate forms the fast-setting component while the foundry sand is a latently active hydraulic component effective during the long-term setting of the composition. We have discovered, quite surprisingly, that upon setting of the hydraulic binder, the calcium sulfate alpha hemihydrate forms a dihydrate which functions as a sulfate activator for the foundry sand. The binder of the invention, when made-up with water, gives rise to an earlier setting because of the reaction of the calcium sulfate alpha hemihydrate and during subsequent exposure to the environment and contact with water, has greater strength in contact with water and hence water resistance as a consequence of the reaction with the activated foundry sand.

We believe that this increase of strength and water resistance results initially during the ettringite formation stage and the formation of the calcium hydrosilicate phases, steeply during the first several days and then tends to flatten off. The sulfate-activated foundry sand reacts in the presence of water to contribute to the calcium hydrosilicate formation.

We have not observed any significant temperature sensitivity of the reaction. At low temperatures, calcium sulfate alpha hemihydrate reacts predominantly at the early stages whereas higher temperatures (equal to or greater than room temperature), give rise to a reaction of both components of the composition.

As a result, the binder of the invention has an extremely high fast-hardening strength and, in spite of the negative slope of the water-resistance curve with time which would characterize the calcium sulfate alpha hemihydrate alone, the water-resistance curve of the hardening mixture increases with time after the initial fast-hardening state.

The product is not only resistant to water, but is also resistant to sulfate attacks and is not particularly sensitive to temperature and does not have significant contraction upon setting.

The early hardening strength is not only very high, but can be selected by the proportions of the two components and it is important to the invention that the foundry sand which is used be activated substantially exclusively by the calcium sulfate dehydrate formed, i.e. not be activated by pretreatment or precombination with alkali components otherwise.

The final strength will depend upon the proportion of the foundry sand used and various compressive strengths of compositions for various purposes can be selected with a high water resistance by adjusting the composition.

The ratio of calcium sulfate alpha hemihydrate and foundry sand can also be varied to vary the curve of the water-resistance characteristic and the water resistance for different purposes.

In a preferred embodiment of the invention, the proportion of the foundry sand is so selected that first a derivative of the water-hardening curve following the period in which the calcium sulfate alpha hemihydrate dihydrate is formed, is in the range of 0 and 1.6 until the hardening composition reaches its final strength. If one operates in this range, one is able to obtain an especially defined suitable value for the water resistance of the hardening mixture. Indeed, the strengths can be obtained when the starting components are used in especially fine form.

In this connection, the invention provides that the calcium sulfate alpha hemihydrate and the foundry sand will be milled at least to the fineness of conventional Portland cement.

In a preferred embodiment of the invention, the calcium sulfate alpha hemihydrate and the foundry sand are milled to a specific surface, according to Blaine, of at least 3000. Preferred is a method of operating in which the calcium sulfate alpha hemihydrate makes-up 30 to 90 mass percent of the total mixture. For many applications, the calcium sulfate alpha hemihydrate and the foundry sand can be in 50:50 proportions.

We have found, most surprisingly, with relatively quite different starting quantities of calcium sulfate alpha hemihydrate, we are able to provide rapid setting hydraulic binders whose hardened mass has defined water resistance. While the formation of ettringite has been found to be detrimental in the production of mortars and concrete hydraulic binders heretofore, the ettringite formation in the hardened mass of the invention is found not to be detrimental. Rather the ettringite formation has been found to be associated with the water resistance at least in major part.

Furthermore, while the prior teachings appear to indicate that alkali activation of the foundry sand by Portland cement or finely ground cement clinker is essential to the prior art, the absence of such alkali activation is an essential component of the composition of the invention and, indeed, both are excluded in the present invention.

The invention thus has the advantage that binders for a wide variety of applications can be fabricated with high strength and high water resistance.

Some of these applications are listed below:

(a) the use of the binder, if desired with aggregates and additives as an instantly setting or early load-bearing construction material for subterranean applications, e.g. mining, tunnel lining and the like, preferably with a weight ratio of the calcium sulfate alpha hemihydrate/foundry sand of 70:30 to 95:5, especially about 90:10.

(b) The use of the binder, if desired with additives and aggregates, for the production of plasterboard, preferably with a weight ratio of calcium sulfate alpha hemihydrate/foundry sand of 80:20 to 95:5, especially about 90:10.

(c) The use of the binder, if desired with aggregates and additives, as a patching mortar, especially as an air field-repair or patching medium, preferably with ratio of the calcium sulfate alpha hemihydrate/foundry sand of 80:20 to 50:50, preferably about 70:30.

(d) The use of the binder, if desired with the aggregates and additives, for tunnel construction, e.g. lining and tunnel stabilization, preferably with a ratio of the calcium sulfate alpha hemihydrate/foundry sand of 60:40 to 30:70.

(e) The use of the binder, if desired with aggregates and additives for producing self-leveling floor or ground application, preferably with a ratio of calcium sulfate alpha hemihydrate/foundry sand of 90:10 to 70:30.

(f) The use of the binder, if desired with aggregates and additives, for the fabrication of porous wall structural elements, advantageously with a ratio of the calcium sulfate alpha hemihydrate/foundry sand of 90:10 to 95:5.

(g) The use of the binder, if desired with aggregates and additives, as a spackling compositon in a ratio of the calcium sulfate alpha hemihydrate/foundry sand of 95:5 to 30:70.

(h) The use of the binder, if desired with aggregates and additives, as a sulfate-resistant injection mortar for the stabilization of brittle and fragmented structures, with a ratio of the calcium sulfate alpha hemihydrate/foundry sand of 50:50 to 10:90.

(i) The use of the binder, if desired with aggregates and additives, for producing suction-scatterable materials.

(j) The use of the binder, for producing load-supporting porous and nonporous wall structures. However, the binder of the invention can also be used in other applications as well. As has been noted, the invention also encompasses the method of making the hardenable composition and both the hardenable composition and the binder itself.

SPECIFIC EXAMPLES

From calcium sulfate alpha hemihydrate as obtained from the desulfurization of flue gases and milled to a fineness of 3200 cm²/g (internal surface according to Blaine) and with a retention of one percent on a 50 micrometer sieve and from foundry sand with a milled fineness of 3500 cm²/g (according to Blaine) mortar mixtures are made in the following mixture ratios:

Mixture 1

95% calcium sulfate alpha hemihydrate, 5% foundry sand.

Mixture 2

65% calcium sulfate alpha hemihydrate, 35% foundry sand.

Mixture 3

50% calcium sulfate alpha hemihydrate, 50% foundry sand.

The foundry sand contained 20% $Al_2O_3$ and the ratio $(CaO+MgO+Al_2O_3)/SiO_2$ was about 2.

The percentages given herein are in weight percent. To the three mixtures, 0.02 parts by weight each of citric acid monohydrate was added. The mixtures were then made-up with a water/solids ratio of 0.3 to settable pastes.

From the pastes, cubic test bodies of a side length of 40 mm were cast. These test samples were removed after 20 minutes and directly upon removal stored under water. At defined times, the compressive strength of the individual press bodies in N/mm² was measured. The results are shown in the sole FIGURE of the drawing. The time of submergence under water is plotted along the abscissa in days and the compressive strength in N/mm² is plotted along the ordinate. The curves obtained with the mixtures 1, 2 and 3 are designated at 1, 2 and 3 on the drawing. In broken lines, we have shown the equivalent curve for an otherwise identical test specimen formed from the calcium sulfate alpha hemihydrate without the foundry sand.

From these curves, it will be apparent that the test sample of calcium sulfate alpha hemihydrate has a time-dependent water-resistance curve which has a negative slope starting from the termination of the fast-hardening portion of the curve.

However, with mixtures 1, 2 and 3, it can be seen as the proportion of the foundry sand changing in the composition with respect to the calcium sulfate alpha hemihydrate, the water-resistance curve or water-strength curve has a varying but positive slope.

It is possible to distinguish three distinct setting phases. The first phase is the rapid setting phase in which the calcium sulfate alpha hemihydrate hardens by the formation of calcium sulfate dihydrate. This takes approximately one day to several days. In the second phase, it appears that the calcium sulfate dihydrate functions as a sulfatic activator for the foundry sand and the reaction in the presence of water produces ettringite in accordance with the equation

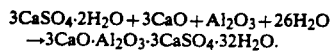
$$3CaSO_4 \cdot 2H_2O + 3CaO + Al_2O_3 + 26H_2O$$
$$\rightarrow 3CaO \cdot Al_2O_3 \cdot 3CaSO_4 \cdot 32H_2O.$$

This results in a relatively sharp rise in the compressive strength curve which, in the examples illustrated by the drawing, are represented by a change in the slope. After about 7 days, there is a flatter rise in the strength curve and in this phase, the terminal strength is reached and the terminal strength can be considered to be a function of the formation of calcium hydrosilicate phases.

Of course, the final strength is not reached during the initial 28 days and thus is not shown on the drawing.

By controlling the mixture ratio, the milling fineness and the use of additives, the various reactions can be controlled as can the final strength over a relatively wide range.

We claim:

1. A method of making a hydraulic binder fast-setting upon make-up with water and with defined water resistance upon hardening, consisting essentially of the steps of:

admixing:

a predetermined starting quantity of from 30 to 90% mass of the binder of pulverulent calcium sulfate alpha hemihydrate as a fast-setting component which, upon mixture with water, forms a hardenable mass having a time-dependent water-resistance curve which has a negative slope starting from an early water-resistance value with fast setting over an initial twenty-eight day period, with a finely ground blast furnace slag sand having an $(CaO+MgO+Al_2O_3)/SiO_2$ ratio $\geq 1$ to form a composition consisting essentially of the calcium sulfate alpha hemihydrate and the finely ground blast furnace slag; and controlling proportions of the finely ground blast furnace slag sand admixed with said quantity of the calcium sulfate alpha hemihydrate that, upon mixing to form a hardening mixture of said composition with water and fast setting, there is a formation of ettringite and calcium hydrosilicate phases, and said proportions are so selected that a time-dependent water-resistance curve of the hardening mixture has an overall positive slope between 0 and 1.6 in the initial twenty-eight days.

2. The method defined in claim 1 wherein said calcium sulfate alpha hemihydrate and the finely ground blast furnace slag sand are admixed by combining and milling them together.

3. The method defined in claim 1 wherein said calcium sulfate alpha hemihydrate is recovered with chloride-containing components as desulfurization gypsum from a wet-scrubbing desulfurization of flue gases.

4. The method defined in claim 1 wherein said finely ground blast furnace slag sand has an $Al_2O_3$ content of at least 13% by weight and in which the weight ratio $(CaO+MgO+Al_2O_3)SiO_2$ is at least 1.6.

5. The method defined in claim 4, further comprising the step of admixing at least one chloride-containing compound with said composition.

6. The method defined in claim 5 wherein said chloride-containing compound is admixed with said composition in an amount so as to form 0.2 to 3 mass percent of the binder.

7. The method defined in claim 4, further comprising the step of admixing iron sulfate with said composition.

8. The method defined in claim 7 wherein said iron sulfate is admixed with said composition in an amount so as to form 0.2 to 3 mass percent of the binder.

9. The method defined in claim 4, further comprising the step of admixing at least one retarder with said composition.

10. The method defined in claim 9 wherein said retarder is citric acid monohydrate.

11. The method defined in claim 1 wherein the calcium sulfate alpha hemihydrate and the finely ground blast furnace slag sand are milled to a hydraulic cement fineness.

12. The method defined in claim 11 wherein the calcium sulfate alpha hemihydrate and the finely ground blast furnace slag sand are milled to a Blaine specific surface of at least 3000.

13. A hydraulic binder as made by the method of claim 1.

14. A hydraulic binder fast-setting upon make-up with water and with defined water resistance upon hardening, consisting essentially of:

a predetermined quantity of from 30 to 90% mass of the binder of pulverulent calcium sulfate alpha hemihydrate as a fast-setting component which, upon mixture with water, forms a hardenable mass having a time-dependent water-resistance curve which has a negative slope starting from an early water-resistance value with fast setting over an initial twenty-eight day period; and finely ground blast furnace slag sand forming a composition with the calcium sulfate alpha hemihydrate, proportions of the finely ground blast furnace slag sand having an $(CaO+MgO+Al_2O_3)/SiO_2$ ratio $\geq 1$ admixed with said quantity of the calcium sulfate alpha hemihydrate being such that, upon mixing to form a hardening mixture of said composition with water and fast setting, there is a formation of ettringite and calcium hydrosilicate phases, and said proportions are so selected that a time-dependent water-resistance curve of the hardening mixture has an overall positive slope between 0 and 1.6 in the initial twenty-eight days.

15. A method of making a hardened composition, consisting essentially of the steps of:

mixing water with a hydraulic binder fast-setting upon make-up with water and with defined water resistance upon hardening, the binder consisting essentially of:

a predetermined quantity of from 30 to 90% mass of the binder of pulverulent calcium sulfate alpha hemihydrate as a fast-setting component which, upon mixture with water, forms a hardenable mass having a time-dependent water-resistance curve which has a negative slope starting from an early water-resistance value with fast setting over an initial twenty-eight day period, and finely ground blast furnace slag sand having an $(CaO+MgO+Al_2O_3)/SiO_2$ ratio $\geq 1$ forming a composition with the calcium sulfate alpha hemihydrate, proportions of the finely ground blast furnace slag sand admixed with said quantity of the calcium sulfate alpha hemihydrate being such that, upon mixing to form a hardening mixture of said composition with water and fast setting, there is a formation of ettringite and calcium hydrosilicate phases, and said proportions are so selected that a time-dependent water-resistance curve of the hardening mixture has an overall positive slope between 0 and 1.6 in the initial twenty-eight days; and causing the resulting mixture to harden.

16. A hardened composition made by the method of claim 15.

* * * * *